May 19, 1964

G. GARABELLO 3,133,741

FUEL TANK CONTROL

Filed Sept. 28, 1961

INVENTOR:
GIUSEPPE GARABELLO

May 19, 1964

G. GARABELLO 3,133,741

FUEL TANK CONTROL

Filed Sept. 28, 1961

INVENTOR:
GIUSEPPE GARABELLO.

United States Patent Office 3,133,741
Patented May 19, 1964

3,133,741
FUEL TANK CONTROL
Giuseppe Garabello, Ivrea 21, Chivasso, Turin, Italy
Filed Sept. 28, 1961, Ser. No. 141,466
Claims priority, application Italy Oct. 10, 1960
2 Claims. (Cl. 280—5)

The present invention relates to remote controlled filler cap and tube assemblies for motor vehicle fuel tanks, its main object being to provide an improvement whereby the filler cap is automatically self-locking against being opened from the exterior of the vehicle.

A second object of the invention is to provide such an assembly wherein the filler cap is operable by cable means from within the vehicle.

A further object is to provide such an assembly wherein the filler cap is operable by electromagnetic means controlled from within the vehicle.

The accompanying drawings show two embodiments in accordance with the invention.

Figures 1, 2:
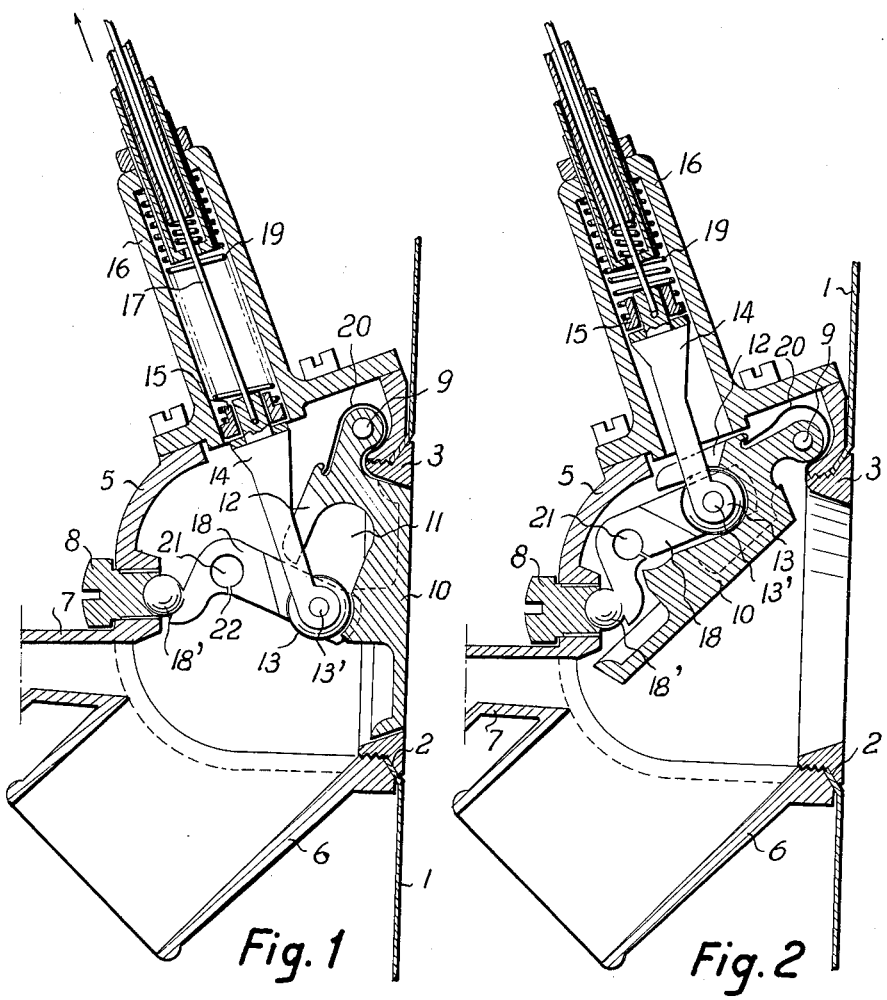
FIG. 1 is a central vertical section of a first embodiment, seen in closed position.
FIG. 2 is a central vertical section of the first embodiment, seen in open position.

The bodywork 1 of the motor-vehicle is provided with an aperture, and the circular edge 2 of the plate is slightly turned inwards in order to form a seating for a bushing 3 screw-threaded and designed to accommodate the die-cast housing 5. The said housing is provided with a connecting-piece 6 to connect it to the tank (not shown in the drawing) and with an air-hole 7. Facing the aperture of the bushing 3 and provided almost in the center of the housing 5 there is a screw-threaded aperture in which is engaged a screw 8, the purpose of which will be described hereinafter.

A valve member 10 is mounted by a pivot 9 on the housing 5, and has a conical circumferential surface which can seat into a conical opening of the bushing 3, the external face of the valve member then being flush with the external face of the bushing 3 and with the bodywork 1. The valve member is provided on the inside with a groove 11 and comprises a fork 12. In the groove 11 there is movable a roller 13 which is mounted in freely rotatable manner on one end of a rod 14. The other end of the rod 14 is coupled to a collar 15 which slides in a cylinder 16 secured on the housing 5. To the latter end of the rod 14 there is secured a cable core 17 which passes longitudinally through the cylinder 16 and of which the other end terminates in a pull-knob (not illustrated in the drawing) on the dashboard.

On the first-mentioned end of the rod 14 there is pivotably mounted one end of an arm 18 secured thereto by a pin 13', the other end 18' of the arm 18 being spherical in shape and resting in a cup formed in the screw 8.

The rod 14 and the cylinder 16 are inclined with respect to the vertical, and when a pull is exerted on the cable core 17, by means of a knob situated on the dashboard, in the direction shown by the arrow in FIG. 1, the rod 14 will move upwards (FIG. 2), taking with it the arm 18 and the valve member 10, assisted by the action of a leaf spring 20. The movement of the valve member 10 causes the fuel inlet orifice to open. The knob situated on the dashboard is then pushed in the opposite direction, and a return-spring 19, situated between the top of the cylinder 16 and the collar 15 will cause the various members to return to the position shown in FIG. 1.

The arm 18 is bent, and includes a hole 21 and a slot 22, so that it is resiliently compressible across its ends. Any play produced by wear is taken up by the tightening of the screw 8. The collar 15 which slides along the cylinder 16 is loosely coupled to the rod 14 so as to permit the latter to perform small relative movements entailed by rotation of the arm 18 about the axis of its spherical head 18'.

Figures 3, 4:
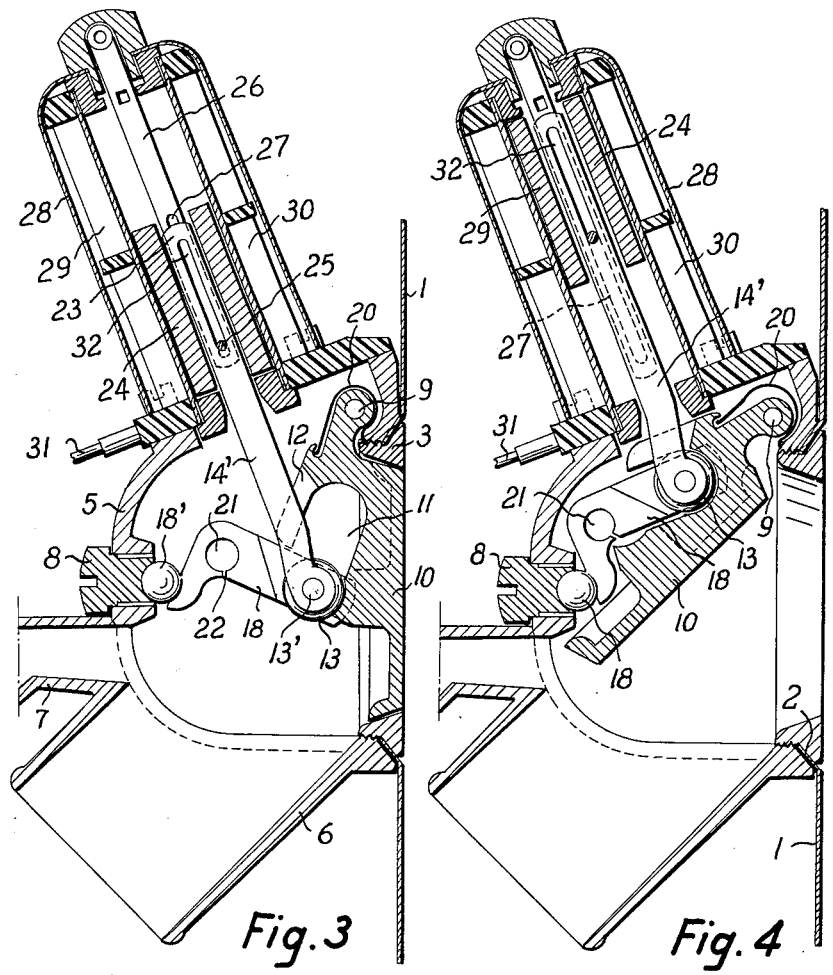
FIG. 3 is a central vertical section of a second embodiment, seen in closed position.
FIG. 4 is a central vertical section of the second embodiment, seen in open position.

In the modification shown in FIGS. 3 and 4, the rod 14', and thus also the valve member 10, are operated electrically by means of a pair of electro-magnet coils 29, 30, as explained hereinafter.

The upper part 23 of the rod 14', is situated inside the magnetic core 24 and has a longitudinal slot 32 therein. The core 24 carries a transverse pin 25 which can move in the slot 32 of the rod 14'. The slotted portion of the rod 14' lies adjacent a plate 26 having a slot 27 and immovably secured within the electromagnets. The pin 25 passes through said slot 37, which limits its longitudinal travel. A casing 28 is provided for the coils 29, 30, which are each in a current feed circuit with a respective push-button switch (not shown) and a source of direct current, such as the conventional storage battery of the vehicle. The circuit arrangement is such that when a first push-button switch is closed, the coil 29 is energised and the core 24 moves up by electromagnetic attraction from the position of FIG. 3 to the position of FIG. 4. In doing so, it moves the assembly of valve member 10 and arm 18 past a dead-center point such that the valve-member can thereafter be swung fully into open position by its spring 20, the slot 32 providing lost motion and permitting the rod 14' to continue moving upwardly when the core 24 has reached the end of its upward travel. Similarly, when a second switch is closed to energise the lower coil 30, the core 24 moves downwardly and its pin 25 drives the rod 14' downwardly to close the valve member 10 onto its seating in the bushing 3.

To prevent the opening of the valve member 10 from the outside, that is to say, an accidental uncontrolled opening-movement, when the valve member is in the closing-position, the axis of the roller 13 is positioned slightly below the line of thrust passing through the bearing surface of the valve member and the axis of the head 18'.

I claim:

1. A remote controlled filler cap assembly for motor vehicle fuel tanks comprising a filler tube connected betwen a fuel tank and the external surface of a vehicle body, a stopper valve, having inner and external surfaces, swingably mounted at the opening of said tube remote from said tank, said valve swinging into said vehicle in open position, the external surface of said valve in closed position being flush with the external vehicle body surface, the inner surface of said stopper valve having a fork shape guide thereon, a loosely rotatable roller connected at one end of a rod, moving in said guide, said rod connected to an arresting arm at said roller end, the end of said arm opposite said roller having a spherical form and seating against a regulating screw in a ball and socket seating, said roller being situated in closed valve position on the axis of said stopper valve and projecting slightly beyond the center of said ball and socket seating to prevent said stopper valve from opening in response to pressure on the external surface thereof, means to pull said rod and to slide said roller in said guide to open said stopper valve and a return device closing said stopper in response to a control within said vehicle body.

2. In an assembly according to claim 1, the said means to pull said rod and slide said roller in said guide being magnetic.

References Cited in the file of this patent
UNITED STATES PATENTS

| | | |
|---|---|---|
| 2,041,387 | Adams | May 19, 1936 |
| 2,054,145 | Tandy | Sept. 15, 1936 |
| 2,151,249 | Vidmar | Mar. 1, 1939 |
| 2,247,509 | Lebus | July 1, 1941 |
| 2,999,613 | Garabello | Sept. 12, 1961 |